(No Model.)
W. RONEY.
EXPANSIBLE DIFFERENTIAL PULLEY.
No. 517,532. Patented Apr. 3, 1894.
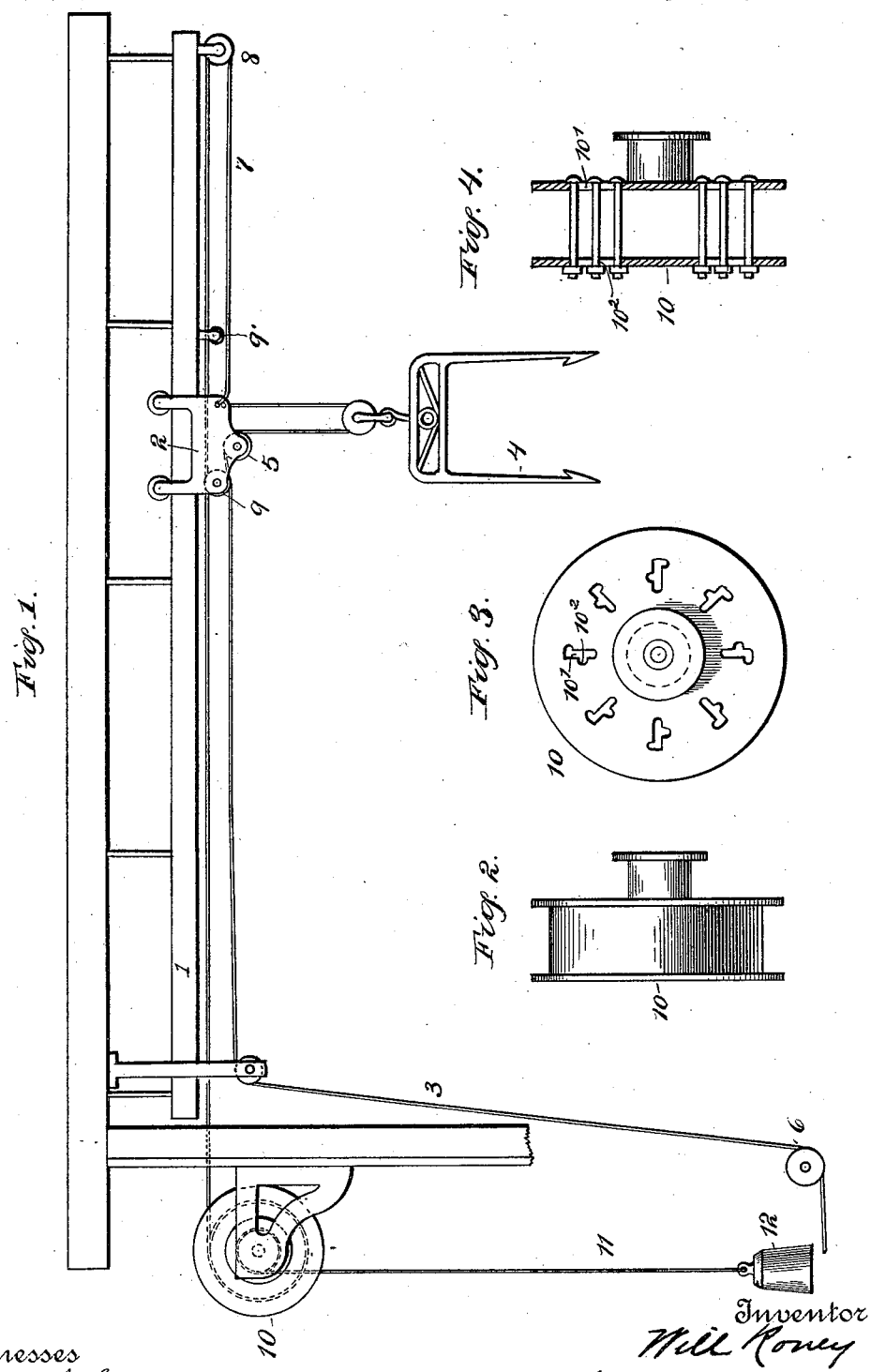

UNITED STATES PATENT OFFICE.

WILL RONEY, OF INDEPENDENCE, IOWA.

EXPANSIBLE DIFFERENTIAL PULLEY.

SPECIFICATION forming part of Letters Patent No. 517,532, dated April 3, 1894.

Application filed September 19, 1893. Serial No. 485,920. (No model.)

*To all whom it may concern:*

Be it known that I, WILL RONEY, a citizen of the United States, residing at Independence, in the county of Buchanan and State of Iowa, have invented certain new and useful Improvements in Expansible Differential Pulleys; and I do hereby declare the following to be a full, clear, and exact description of the invention, such as will enable others skilled in the art to which it appertains to make and use the same.

My invention relates to improvements in pulleys, and it consists in an improved expansible differential pulley, the construction and arrangement of parts of which will be hereinafter fully described and particularly pointed out in the claim.

The object of my invention is to produce an expansible differential pulley of cheap construction, and strong design, the ratio of the drums of which can be readily changed; and I accomplish this object by the use of a pulley having a drum of fixed diameter and a drum whose diameter is made adjustable by virtue of its construction, its sides being formed of circular disks having notched radial slots cut therein, and its surface of rods, passing between the circular disks and held in one or another of the sets of notches.

My pulley is susceptible of very many uses, but I shall describe the same in connection with a hay carrier return; as that is the manner in which I specially intend to use it. When adapted to use on a hay carrier return, around the large drum of the pulley is wound a rope which is attached to a trolley carriage running along a beam centrally located in the barn, and having depending therefrom a hay fork, and on the small drum of which is wound a rope to which is attached a weight. The hay carrier is moved from one end of the barn to the other upon its supporting beam by means of a separate pull rope attached to a horse, and the ropes upon the differential pulley are so arranged that when the hay has been deposited from the hay fork, and the pull rope is released, the weight will act to cause the differential pulley to rotate and return the hay carrier, with the hay fork depending therefrom, to the other end of the barn, and in position to receive another load.

My invention is fully represented in the drawings accompanying and forming a part of this application, in which the same reference-numbers refer to the same or corresponding parts, and in which—

Figure 1 is a perspective view of my hay carrier return in position in a barn. Fig. 2 is a view of the differential pulley I use. Fig. 3 is a side view of the same, showing the radial slots by means of which adjustment of the ratio of the two drums of the pulleys to each other is made possible. Fig. 4 is a view showing the method of the construction of the differential pulley.

Referring to the drawings, 1 indicates a beam extending through the whole length of the barn and centrally placed therein. Upon this beam, supported by wheels which run on the upper surface of the same, travels the carriage 2. At one side of this trolley carriage is firmly secured one end of the pull rope 3, which passes over a pulley attached to the hay fork 4, over pulley 5, journaled in the trolley carriage 2, around pulley 6 secured at the inner end of the barn, and out through the open end of the barn, at which place it can be attached to a horse. The construction is such that the carriage 2 can be drawn by means of this rope the whole length of the beam 1. To the carriage 2 is also attached one end of the return rope 7, which passes around a pulley 8 attached to that end of the beam 1 which is near the door of the barn, and thence passes over a suitable guiding pulley 9 in the trolley carriage to the larger drum of the differential pulley. I should also mention that a pulley 9' is placed intermediate the position of the trolley carriage which it has when the hay fork is unloaded and the outer end of the beam 1, which serves in part to relieve the strain from the return rope 7, and to prevent it from interfering with the travel of the carrier. To the other drum of the differential pulley 10 is secured a rope 11, to the end of which is attached the weight 12.

The differential pulley which I make use of and which forms the subject of this application, is of novel construction. It is shown in detail in Figs. 2, 3 and 4. In Fig. 3 is shown the means by which the ratio between the two drums of the pulley can be altered at will. In the circular disks which form the sides of the larger drum are cut radial slots 10', in which are formed, at various places, notches or recesses 10². The surface of this larger drum is formed by means of bolts, which pass through the sides of the drum either at the inner ends of the radial slots formed in the same, or which rest in some one of the notches formed in said slots. It will thus be seen that a choice of diameters of the larger drum of the pulley is permitted, and that thus the ratio between the sizes of the two drums can be chosen at will. This feature is of importance, as the length of the weight rope 11 is determined by the height of the differential pulley from the ground, and it is necessary to so arrange the ratio between the two drums of this pulley that the fall of the weight will return the trolley carriage through the whole length of the barn. This ratio varies in different barns, and by my construction my device can be adjusted for use in a number of barns.

The operation of my device is as follows: When the hay fork is unloaded, it is at the open end of the barn. When in this position, the rope on the large drum of the differential pulley is wound up, and the weight rope is unwound. The support of the hay fork from the carrying trolley 2 is such that said fork may be lowered to receive its load of hay. After the fork has been loaded by means of the pull rope, the trolley carriage 2 is moved along the beam 1 until the hay fork is in position to put its load of hay in the hay loft. When this is done, and the pull rope is suitably released, the weight 12, the rope attached to which has been wound upon the smaller drum of the differential pulley during the movement of the carrier trolley, falls, and the carrier trolley is forced back to the other end of the barn. This movement is accomplished without the expenditure of any work, and is entirely automatic and certain in its operation.

Having thus fully described my invention, what I claim as new, and desire to secure by Letters Patent, is—

An expansible differential pulley consisting of a drum of fixed diameter and a drum of variable diameter, the latter drum having its sides formed of circular disks having notched radial slots cut therein, and having its surface formed by rods passing between said disks and held in one or another set of notches, substantially as described.

WILL RONEY.

Witnesses:
H. M. SILL,
M. L. SWEENEY.